United States Patent [19]
Lapke

[11] Patent Number: 6,094,617
[45] Date of Patent: Jul. 25, 2000

[54] ENGINE POWER MONITORING SYSTEM

[75] Inventor: Robert A. Lapke, Peoria, Ill.

[73] Assignee: Caterpillar Inc., Peoria, Ill.

[21] Appl. No.: 09/219,965

[22] Filed: Dec. 23, 1998

[51] Int. Cl.[7] ........................... F02D 41/14; G01M 15/00
[52] U.S. Cl. ........................... 701/104; 701/114; 73/112; 123/350; 340/439
[58] Field of Search .................................. 701/102, 104, 701/107, 114, 115; 73/112, 116, 117.3; 123/350; 340/439

[56] References Cited

U.S. PATENT DOCUMENTS

| 5,594,643 | 1/1997 | Birchenough | 701/51 |
| 5,609,067 | 3/1997 | Mitchell et al. | 74/336 R |
| 5,609,550 | 3/1997 | Saxena et al. | 477/166 |
| 5,848,371 | 12/1998 | Creger | 701/102 |

Primary Examiner—Andrew M. Dolinar
Attorney, Agent, or Firm—Haverstock Garrett & Roberts

[57] ABSTRACT

A system for monitoring the output power of an engine associated with a work machine based upon monitoring the input and output speeds of a torque converter or torque divider coupled to the engine, the present system including a first sensor for determining engine speed, a second sensor for determining the throttle position of the engine, a third sensor for determining the output speed of the torque converter or torque divider, and an electronic controller coupled to the first, second and third sensors for receiving signals therefrom, the controller comparing the actual engine speed and the actual torque converter or divider output speed at a particular throttle setting to an engine speed and converter/divider output speed indicative of optimal or desired engine power output at that same throttle position and thereafter outputting a signal to a monitoring/warning system indicative of low engine power performance when the controller receives a signal from the third sensor indicative of the converter/divider output speed being less than a predetermined converter/divider output speed based upon optimal or desired engine performance at that particular throttle position.

18 Claims, 2 Drawing Sheets

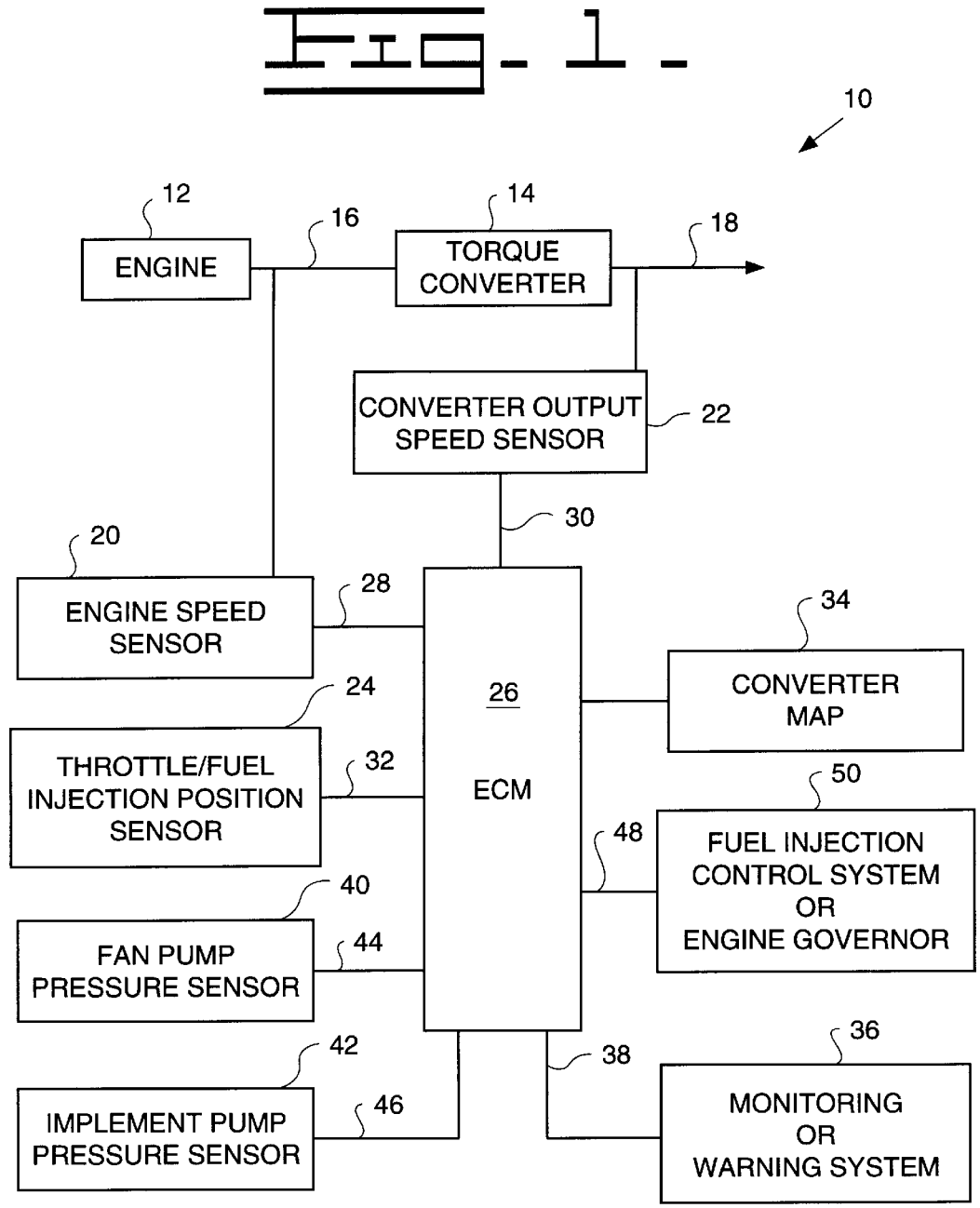

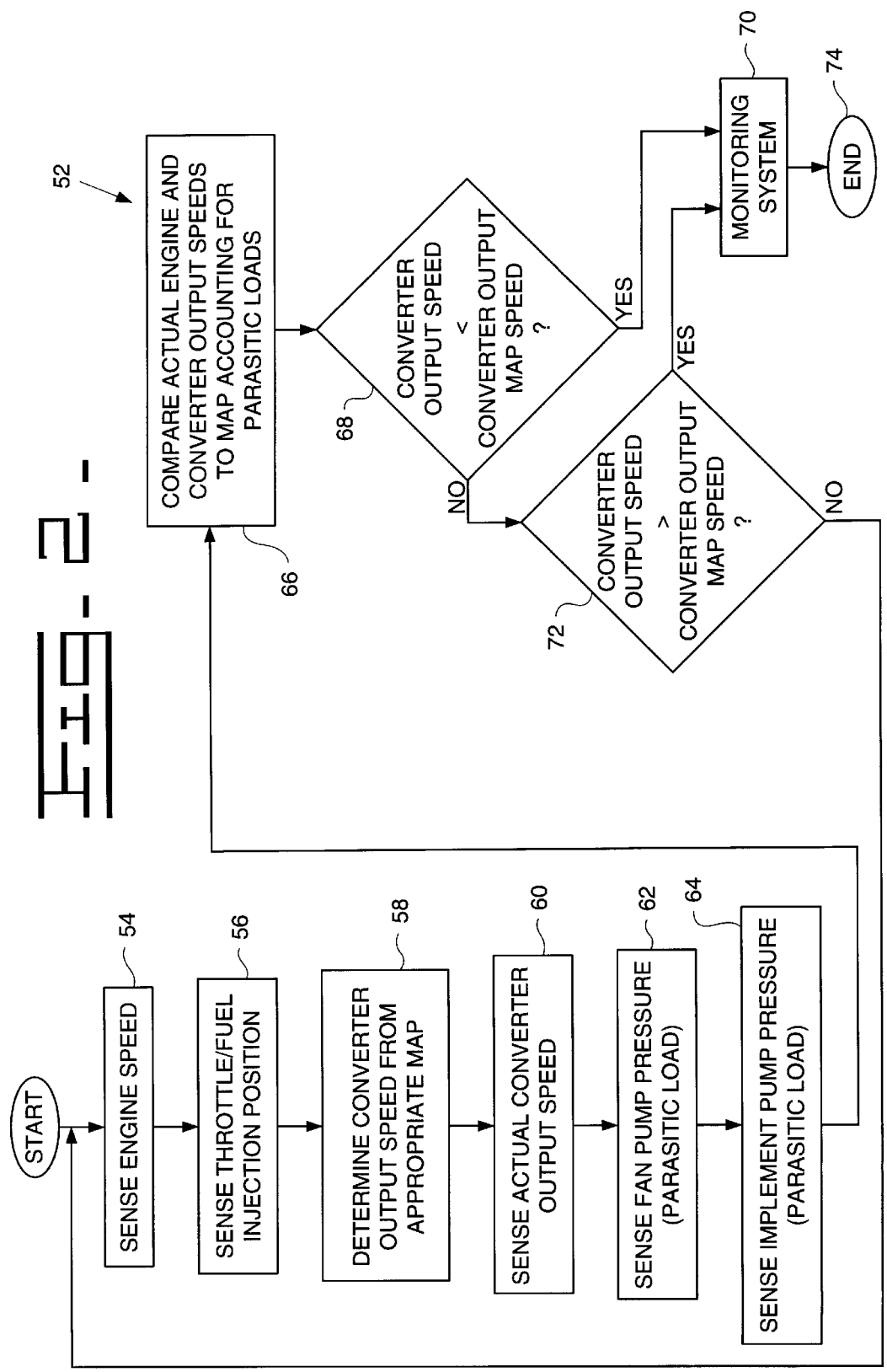

6,094,617

ENGINE POWER MONITORING SYSTEM

TECHNICAL FIELD

This invention relates generally to systems for monitoring the power output of an engine and, more particularly, to a system for monitoring the output power of an engine associated with a work machine based upon monitoring the input and output speeds of a torque converter coupled to the engine and thereafter comparing the relationship between such speeds to a speed relationship indicative of optimal or desired engine power output based upon a particular engine throttle position.

BACKGROUND ART

Work machines such as track type tractors and a wide variety of other types of heavy duty mining and earthmoving equipment often work in environments which give rise to potential engine problems which affect engine performance. Due to the very nature of the work involved, normal wear and tear always involves operating these types of engines under extreme load conditions. If a particular work machine engine is not performing optimally, the particular work task being performed by that particular work machine may suffer in terms of load capability, time efficiency, costs and other parameters indicative of optimal performance. In addition, poor engine performance may also be an indication of impending damage to or catastrophic failure of the engine.

Detection of low engine power or poor engine performance is therefore important not only because it will affect the particular work task being performed, but detection of such low power conditions can minimize repair expenses and can allow for corrective action to be taken before any further damage to the engine, or surrounding components, occurs.

It is therefore desirable to provide an engine monitoring system which senses the condition of the engine and determines if such engine is operating within normal performance parameters and advises the machine operator of any low engine power performance.

Accordingly, the present invention is directed to overcoming one or more of the problems as set forth above.

DESCRIPTION OF THE INVENTION

In accordance with the teachings of the present invention, an engine power monitoring system is disclosed for monitoring the performance of an engine which is connected to a torque converter. Since torque converters are quite consistent, a given input speed should produce a given output speed under full throttle/fuel injector conditions, or under any other predetermined throttle/fuel injection position. By measuring and mapping the converter input and output speeds at various throttle positions, a correlation can be established between throttle position, engine speed and converter output speed. In this regard, since the output of the engine is connected to the torque converter through a common drive shaft or other gearing, the engine output speed will be either equal or proportional to the input shaft speed of the torque converter. As a result, based upon a predetermined correlation between engine output speed, converter input speed and converter output speed at optimal engine power performance for a given throttle position, the measured relationship between the input and output speeds of the torque converter can be easily compared with the predetermined optimal relationship between these speeds to determine any deterioration or degradation of engine power at a particular throttle setting. Any trend towards a lower converter output speed for a given input speed while at a particular throttle setting will be an indication of low input power to the converter from the engine.

The present monitoring system therefore includes a plurality of sensors which are positioned and located to measure and monitor engine speed, the output speed of the torque converter, the position of the throttle or fuel injection control valves, and at least some of the major parasitic loads exerted on the engine, all of which sensors are coupled to and interface with an electronic control module (ECM) which compares such sensor inputs to a predetermined converter speed correlation map to determine the power performance of the engine. If the electronic controller determines that the output power of the engine is below normal operating performance levels for a particular throttle position, the controller will calculate a value for the amount by which the engine output power is low and can output such information to a display or warning monitor located in the operator compartment of the work machine. This low power performance value can be calculated as a percentage of full expected power, as an actual power value, or such engine performance information can be used with other logic associated with the controller to provide a simple warning signal of low engine power to the operator compartment. This engine power performance data can likewise be stored by the electronic controller over the life of the work machine and such data can be accessed and utilized in diagnosing or predicting a component or system failure, or such data can be used for trend analysis purposes.

In still another aspect of the present invention, the present engine power monitoring system can provide automatic control to correct for low engine power output under certain conditions. In this regard, the converter speed correlation map stored within the memory of the electronic controller may be used by the controller to increase the amount of fuel delivered to the engine so as to adjust the engine speed output to match the speed correlation stored in the converter map for optimal performance.

BRIEF DESCRIPTION OF THE DRAWINGS

For a better understanding of the present invention, reference may be made to the accompanying drawings in which:

FIG. 1 is a schematic diagram of an engine power monitoring system constructed in accordance with the teachings of one embodiment of the present invention; and FIG. 2 is a flow chart of the operating steps for an engine power monitoring system constructed in accordance with the teachings of one embodiment of the present invention.

BEST MODE FOR CARRYING OUT THE INVENTION

Referring to FIG. 1, numeral 10 in FIG. 1 represents one embodiment of an engine power monitoring system that incorporates the principles of the present invention. As illustrated in FIG. 1, an engine 12 associated with a particular work machine used to drive such machine and other systems associated therewith is typically connected to a torque converter 14 through a connecting drive shaft 16, the output speed of shaft 16 from engine 12 being equal to the input speed of shaft 16 to the torque converter 14. In the case where the engine 12 is connected through gearing to the torque converter 14, the output speed of shaft 16 will be proportional to the input speed of the converter 14. An output shaft 18 is connected to the output side of the torque converter 14 and such shaft 18 is typically representative of a main drive shaft which would normally connect to the transmission system (not shown) of the work machine.

It is recognized and anticipated that the torque converter 14 may be coupled to the engine 12 in a wide variety of different arrangements and the simplified illustration of this coupling as set forth in FIG. 1 is for illustrative purposes only. Regardless of the actual connection configuration between the engine 12 and the torque converter 14, the torque converter input speed will be equal to or proportional to the output speed of the engine 12. Since the engine output speed is representative of the output power of the engine, the input speed to the torque converter 14 will likewise be representative of the engine output power.

When engine 12 is operating normally and at its optimum efficiency and performance, a table or map can be developed for each different throttle position or setting wherein a given converter input speed is correlated to a specific converter output speed. This measured correlation or relationship between converter input and output speeds at a plurality of different throttle positions will represent normal operation of the engine at such various throttle positions. A map for each throttle position or setting can be developed through testing of the particular work machine by taking on-going measurements of engine performance during the operation thereof.

The present engine power monitoring system 10 includes an engine speed sensor 20, a converter output speed sensor 22, and a throttle or fuel injection position sensor 24, all of which sensors provide input signals to an electronic control module (ECM) 26. Based upon the signals from sensors 20, 22 and 24, ECM 26 will monitor the output power of engine 12 and provide appropriate output signals to a display/monitoring or warning system which will provide engine power performance information to the operator of the work machine. ECM 26 may also control output signals to various systems of the work machine such as the fuel injection control system or the engine governor system 50 for reasons which will be hereinafter explained. Output signals to these fuel control type systems will typically be directed to various fuel admission valves, fuel injectors and other devices for controlling the delivery of fuel to the engine, which valves, fuel injectors and other devices are used in a conventional manner to control the delivery of fuel to the engine. In this regard, ECM 26 would deliver current control signals to such devices in a manner well known to a person skilled in the art.

Electronic controllers or modules such as ECM 26 are likewise commonly used in association with work machines for controlling and accomplishing various functions and tasks including monitoring and controlling engine functions such as engine speed, engine load and fuel flow to the respective cylinders and fuel injectors associated with a particular engine. ECM 26 may also typically include processing means, such as a microcontroller or microprocessor, associated electronic circuitry such as input/output circuitry, analog circuits or programmed logic arrays, as well as associated memory. It is known in the art to incorporate within ECM 26 appropriate driver circuitry for delivering current signals to the various valves and other devices associated with various systems on the work machine.

An engine speed sensor 20 is coupled to ECM 26 via conductive path 28 for constantly delivering engine speed indicative signals to ECM 26 during the operation of the particular work machine. The sensor 20 may be connected to the output shaft 16 illustrated in FIG. 1, or such sensor may be associated with the cam shaft of engine 12. Engine speed sensors or transducers are well known in the art and are commonly used to measure the engine output speed. Other suitable engine speed sensors such as magnet speed pickup sensors, Hall effect sensors, tachometers and the like may likewise be utilized without departing from the spirit and scope of the present invention.

A similar type speed sensor 22 is likewise coupled to the output shaft 18 of the torque converter 14 so as to monitor and measure the output speed of the torque converter. Sensor 22 is coupled to ECM 26 via conductive path 30 for constantly delivering speed indicative signals to ECM 26 during the operation of the particular work machine.

A throttle/fuel injection position sensor 24 is also coupled to ECM 26 via conductive path 32 for constantly monitoring the engine throttle position and for delivering throttle/fuel injection position indicative signals to ECM 26 during the operation of the particular work machine. Such throttle position/fuel injection type sensors are likewise well known in the art, a detailed description of such sensors is not included herein.

Within the memory of ECM 26 is stored the various lookup tables or torque converter speed correlation maps 34 previously discussed. These maps correlate the relationship between the engine output speed (or torque converter input speed) and the torque converter output speed at various throttle positions. Although it is recognized that any plurality of such maps can be stored within the memory of ECM 26 for any plurality of different throttle positions, it is also recognized that it is a lot easier to check the power output of a particular engine at the full throttle position only, it being assumed that if the engine is operating within normal power limits at full power, it will likewise be operating within normal power limits at other throttle settings. This would likewise obviate the need for developing a plurality of different maps for different throttle positions. Nevertheless, whether a plurality of converter input/output speed correlation maps are stored within ECM 26, or whether just a single converter map 34 is utilized for the full throttle position, such converter speed correlation maps will be accessed by ECM 26 to monitor the power output of engine 12 in the following manner.

Based upon inputs from sensors 20 and 24 relating to the actual engine output speed and throttle position, ECM 26 will access the appropriate converter map 34 and determine the appropriate or desired converter output speed for that particular throttle position. ECM 26 will then read the actual converter output speed from sensor 22 and will compare such actual converter output speed to the desired converter output speed based upon the appropriate map 34. Since torque converters are quite consistent, any trend towards a lower converter output speed based upon a given input speed while at a predetermined throttle position would be an indication of low input power from engine 12. If, based upon this comparison, ECM 26 determines that the converter output speed is less than the converter output speed called for by the appropriate map 34, a low engine power output condition exists. In this situation, ECM 26 is also coupled to some type of monitoring or warning system 36 via conductive path 38 and will output an appropriate warning signal through system 36 to the operator compartment. This warning signal will advise the operator that the work machine engine is operating under a less than normal power condition.

In this regard, ECM 26 can likewise calculate a value for the amount of power by which the engine power output is below normal operating conditions and can display such low power information to the machine operator. This low power value can likewise be displayed via conductive path 38, or another conductive path between monitoring system 36 and display means located in the operator compartment, as either a percentage of full expected power, as the actual power value of the engine at the particular throttle setting, or such low power value can be utilized with other logic to provide some type of visual and/or audio warning signal in the operator compartment. Power percentage figures could likewise be displayed on appropriate computer screens associated with the particular work machine.

It is also recognized that other systems associated with the work machine utilize power from engine 12 which may affect the converter output speed. For example, fan pumps and implement pumps utilize power from engine 12 to control the operation thereof and these types of parasitic loads will reduce the converter output speed accordingly. For example, if an implement pump utilizes 100 horsepower (hp) for its operation, the horsepower associated with the converter input speed will be 100 hp less than the normal converter input horsepower if the implement pump was not being operated. This power input loss due to parasitic loads can be accounted for in several ways. For example, the converter maps 34 can be adjusted accordingly to take into account all of the various parasitic loads associated with a particular work machine such that the converter output speed associated with the maps will be representative of normal engine performance with the various parasitic systems in operation.

In another aspect of the present invention, at least the major parasitic loads can be accounted for by ECM 26 by sensing the operation of these parasitic loads. For example, a fan pump pressure sensor 40 and an implement pump pressure sensor 42 may be coupled to ECM 26 via conductive paths 44 and 46 as shown in FIG. 1 for constantly delivering pressure indicative signals to ECM 26 during the operation of the particular work machine. Such pressure sensors are well known in the art and therefore a detailed description of such sensors is not included herein. ECM 26 will read this pressure information from the parasitic loads and, via appropriate lookup tables, maps or other algorithms, will convert such pressure data into power usage and will compare the same with the power output associated with the output side of the converter 14. These two power outputs will be summed and then compared with the desired converter output speed or power associated with the appropriate map 34. In this way, ECM 26 can account for power losses due to parasitic loads and can make a determination if the converter output speed sensed by sensor 22 is representative of normal engine operation.

In still another aspect of the present invention, under certain situations, ECM 26 may provide appropriate output signals to automatically control the delivery of fuel to the respective fuel injectors associated with engine 12 in an effort to attempt to correct a low power condition. In this particular situation, ECM 26 could output appropriate signals via conductive path 48 to the fuel injection control system or engine governor system 50 to increase the delivery of fuel to the engine in order to increase the power output so as to match the desired converter output speed dictated by the appropriate converter map 34. Here again, the output signal 48 from ECM 26 would typically control the operation of various fuel admission valves and fuel injectors associated with engine 12. Appropriate programming for accomplishing this task can likewise be associated with ECM 26.

It is also recognized and anticipated that some work machines may utilize a torque divider assembly to route at least some of the torque available to the torque converter 14 around the converter to other appropriate systems. A torque divider assembly will typically include a torque converter plus an appropriate gear train to accomplish the appropriate division of torque. Appropriate maps for the torque divider assembly, similar to the converter maps 34, can likewise be developed such that the torque divider input and output speeds can be measured and compared in accordance with the teachings of the present invention so as to give an accurate indication of engine output power. The various maps associated with the torque divider would therefore take into account any re-routing of the torque around the torque converter and nominal relationships between the input and output speeds of a torque divider will produce the same results as explained above with respect to the torque converter input and output speeds. Use of the term "torque converter" throughout this application is therefore intended to include use of a "torque divider assembly" which may be coupled to a particular engine in lieu of a torque converter.

INDUSTRIAL APPLICABILITY

As described herein, the present engine power monitoring system 10 has particular utility in all types of work machines and other vehicles which have a torque converter or torque divider assembly coupled to the engine of the work machine or other vehicle.

An example of operation in accordance with one aspect of the present invention is set forth in the flow chart 52 illustrated in FIG. 2. The operating steps in control loop 52 can be incorporated into the programming of the processing means of ECM 26 by techniques well known to those of ordinary skill in the art. The operating steps of flow chart 52 can be initiated at any time while the engine of the work machine is operating such as through operator selectable means associated with the particular work machine, such operator selectable means including switch means positionable by the operator to select activation of the present monitoring system 10; a computer system associated with the work machine or other vehicle having operator selectable commands for selecting activation of the present monitoring system 10; or the operating steps of flow chart 52 can be programmed to continuously run while the work machine is operating based upon some predetermined repeat interval or other criteria.

Once control loop 52 is initiated, the actual engine speed and throttle/fuel injection position of the work machine is sensed at steps 54 and 56 by sensors 20 and 24 and such information is then inputted and stored into the memory associated with ECM 26 via conductive paths 28 and 32. At step 58, ECM 26, based upon the particular throttle/fuel injection position sensed via sensor 24, will determine the appropriate converter map 34 to be used and will likewise determine the desired converter output speed for the given input speed. At step 60, ECM 16 will receive inputs from sensor 22 indicative of the actual converter output speed via conductive path 30 and such information will likewise be stored within the memory of ECM 26. At steps 62 and 64, ECM 26 will receive inputs from pressure sensors 40 and 42 via conductive paths 44 and 46 relative to the pressures associated with the fan pump and implement pump. These pressure indicative signals will be converted by ECM 26, via appropriate logic and programming, so as to be indicative of the parasitic loads being utilized by these devices. In this regard, it is recognized and anticipated that any number of sensors may be utilized to monitor any number of parasitic load devices and/or systems associated with a particular machine.

At step 66, ECM 26 will compare the actual engine speed and converter output speed to the appropriate map selected at step 58, and ECM 26 will likewise take into account the parasitic loads associated with the fan pump and implement pump in comparing the various speed relationships as previously explained. Based upon this comparison, ECM 26 will take appropriate action as set forth at step 68. For example, at step 68, if the actual converter output speed is not less than the converter output speed associated with the appropriate map determined at step 58, and is within some predetermined acceptable range, including accountability for any parasitic loads reducing the power output associated with the output side of the torque converter 14, no power loss is associated with the operation of engine 12. At this particular point in time, ECM 26 could be programmed to loop back to step 54 and repeat control loop 52, or ECM 26 could merely terminate control loop 52.

If, on the other hand, at step 68, ECM 26 determines that the actual converter output speed is, in fact, less than the converter output speed dictated by the appropriate map 34, and that such speed is likewise outside of any predetermined acceptable range, ECM 26 will output appropriate signals to the monitoring system 36 at step 70 to advise the operator of the machine that a low engine power condition exists. As previously explained, this warning signal could activate some type of visual and/or audio warning signal in the operator compartment, or ECM 26 could display some type of engine power performance value such as a percentage of full expected engine power, an actual engine power value, or some other predetermined power performance value. At this particular point in time, ECM 26 could again loop back to step 54 and repeat control loop 52, or control loop 52 could be terminated at step 74.

Still further, if, at step 68, no low engine power condition exists, ECM 26 could also be programmed to perform optional step 72 wherein the actual converter output speed is again compared to the converter output speed associated with the appropriate converter speed correlation map and, if the actual converter output speed is not greater than the converter output speed associated with the appropriate map 34, and is within some predetermined acceptable range, no overspeed or overpower condition is associated with engine 12 and, at this point in time, engine 12 is operating within normal operating parameters and ECM 26 would again either loop back to step 54, or terminate control loop 52. If, on the other hand, at optional step 72, the actual converter output speed is greater than the converter output speed dictated by the appropriate map 34, and outside of any predetermined acceptable range, an overspeed or some other type of malfunction condition exists and ECM 26 could output appropriate control signals to the monitoring system 36 at step 70 so as to advise the operator of the machine that this condition is occurring and that the engine is operating outside of defined normal limits for that particular throttle position.

Under certain conditions, based upon the comparison made at step 68, if a low engine power condition exists, ECM 26 could likewise be programmed to output appropriate signals via conductive path 48 to either the fuel injection control system or the engine governor system to increase the amount of fuel delivery to the fuel injectors in order to increase the power output of the engine to match the converter output speed dictated by the appropriate map 34 for that particular throttle position.

It is also recognized that variations to the operating steps depicted in flow chart 52 could be made without departing from the spirit and scope of the present invention. In particular, steps could be added or some steps could be eliminated. All such variations are intended to be covered by the present invention. It is also recognized and anticipated that the present engine power monitoring system 10 could be activated through the use of an external device, either mounted on the machine or used as a service tool, such as a laptop computer. In this particular scenario, with the work machine operating at a particular throttle position, the external device would access ECM 26 and activate the operating steps of flow chart 52 to run a check of the engine power performance, or the program of flow chart 52 could be stored within the laptop computer and such computer could interface with ECM 26 to monitor the power output of the engine.

Other aspects, objects and advantages of the present invention can be obtained from a study of the drawings, the disclosure and the appended claims.

What is claimed is:

1. A system for monitoring engine performance of a work machine wherein the work machine includes an engine coupled to a torque converter, said system comprising:

a first sensor for determining engine speed;

a second sensor for determining the throttle position of the engine;

a third sensor for determining the output speed of the torque converter;

an electronic controller coupled with said first, second and third sensors for receiving signals therefrom, said controller being operable to receive a signal from said first sensor indicative of the speed of the engine, a signal from said second sensor indicative of the throttle position of the engine, and a signal from said third sensor indicative of the output speed of the torque converter;

monitoring means for producing a signal indicative of low engine performance, said monitoring means being coupled to said electronic controller for receiving signals therefrom; and memory means coupled to said controller and having stored therein a plurality of different engine speed and converter output speed correlations, each correlation representing the engine speed and converter output speed at a particular throttle position;

said controller outputting a signal to said monitoring means indicative of low engine power performance when said controller receives a signal from said first sensor indicative of the speed of the engine, a signal from said second sensor indicative of the throttle position of the engine, and a signal from said third sensor indicative of the converter output speed being less than a predetermined converter output speed, said predetermined converter output speed being determined from the engine speed and converter output speed correlation selected by said controller based upon signals received from said first and second sensors.

2. The system, as set forth in claim 1, wherein said predetermined converter output speed is equal to the converter output speed associated with the engine speed and converter output speed correlation selected by said controller based upon the signals received from said first and second sensors.

3. The system, as set forth in claim 1, wherein said predetermined converter output speed is adjusted for parasitic loads associated with the work machine.

4. The system, as set forth in claim 1, wherein the work machine includes at least one parasitic system which draws power from the engine, said system further comprising:

at least one additional sensor associated with said parasitic system for determining the parasitic load associated therewith, said controller being coupled to said at least one additional sensor for receiving signals therefrom, said controller being operable to receive a signal from said at least one additional sensor indicative of the parasitic load associated with said parasitic system, said controller outputting a signal to said monitoring means indicative of a low engine power performance when said controller receives a signal from said third sensor and from said at least one additional sensor indicative of the converter output speed being less than said predetermined converter output speed.

5. The system, as set forth in claim 4, wherein said at least one parasitic system includes a fan pump.

6. The system, as set forth in claim 4, wherein said at least one parasitic system includes a implement pump.

7. The system, as set forth in claim 1, wherein the work machine includes a fuel injection control system for controlling the delivery of fuel to the engine;

said electronic controller being further coupled to the fuel injection control system and being capable of outputting signals to such fuel injection control system to control the amount of fuel being delivered to the engine;

said controller outputting a signal to the fuel injection control system to increase the amount of fuel being delivered to the engine when said controller receives a signal from said third sensor indicative of the converter output speed being less than said predetermined converter output speed.

8. The system, as set forth in claim 1, wherein the work machine includes an engine governor system for controlling the delivery of fuel to the engine;

said electronic controller being further coupled to the engine governor system and being capable of outputting signals to such engine governor system to control the amount of fuel being delivered to the engine;

said controller outputting a signal to the engine governor system to increase the amount of fuel being delivered to the engine when said controller receives a signal from said third sensor indicative of the converter output speed being less than said predetermined converter output speed.

9. The system, as set forth in claim 1, wherein said monitoring means includes display means for displaying a representation of the low engine performance signal.

10. The system, as set forth in claim 9, wherein said representation of the low engine performance signal includes a visual signal displayed in the operator compartment of the work machine.

11. The system, as set forth in claim 9, wherein said representation of the low engine performance signal includes an audio signal generated in the operator compartment of the work machine.

12. A system for monitoring engine performance of a work machine wherein the work machine includes an engine coupled to a torque converter, said system comprising:

a first sensor for determining engine speed;

a second sensor for determining the output speed of the torque converter;

an electronic controller coupled with said first and second sensors for receiving signals therefrom, said controller being operable to receive a signal from said first sensor indicative of the speed of the engine, and a signal from said second sensor indicative of the output speed of the torque converter;

monitoring means for producing a warning signal indicative of low engine power performance, said monitoring means being coupled to said electronic controller for receiving signals therefrom;

memory means coupled to said controller and having stored therein an engine speed and converter output speed correlation representative of the engine performance at the full throttle position;

said controller outputting a signal to said monitoring means when said controller receives a signal from said first sensor indicative of the speed of the engine, and a signal from said second sensor indicative of the converter output speed being less than a predetermined converter output speed, said predetermined converter output speed being determined from the engine speed and converter output speed correlation for operation of the engine at the full throttle position.

13. The system, as set forth in claim 12, wherein said predetermined converter output speed is equal to the converter output speed associated with the engine speed and converter output speed correlation for the full throttle position.

14. The system, as set forth in claim 12, wherein said predetermined converter output speed is adjusted for parasitic loads associated with the work machine.

15. The system, as set forth in claim 12, wherein the work machine includes at least one parasitic system which draws power from the engine, said system further comprising:

at least one additional sensor associated with said parasitic system for determining the parasitic load associated therewith, said controller being coupled to said at least one additional sensor for receiving signals therefrom, said controller being operable to receive a signal from said at least one additional sensor indicative of the parasitic load associated with said parasitic system, said controller outputting a signal to said monitoring means when said controller receives a signal from said second sensor and from said at least one additional sensor indicative of the converter output speed being less than said predetermined converter output speed.

16. A system for monitoring engine performance of a work machine wherein the work machine includes an engine coupled to a torque divider, said system comprising:

a first sensor for determining engine speed;

a second sensor for determining the throttle position of the engine;

a third sensor for determining the output speed of the torque divider;

an electronic controller coupled with said first, second and third sensors for receiving signals therefrom, said controller being operable to receive a signal from said first sensor indicative of the speed of the engine, a signal from said second sensor indicative of the throttle position of the engine, and a signal from said third sensor indicative of the output speed of the torque divider;

monitoring means for producing a signal indicative of low engine performance, said monitoring means being coupled to said electronic controller for receiving signals therefrom; and memory means coupled to said controller and having stored therein a plurality of different engine speed and torque divider output speed correlations, each correlation representing the engine speed and torque divider output speed at a particular throttle position;

said controller outputting a signal to said monitoring means indicative of low engine power performance when said controller receives a signal from said first sensor indicative of the speed of the engine, a signal from said second sensor indicative of the throttle position of the engine, and a signal from said third sensor indicative of the torque divider output speed being less than a predetermined torque divider output speed, said predetermined torque divider output speed being determined from the engine speed and torque divider output speed correlation selected by said controller based upon signals received from said first and second sensors.

17. The system, as set forth in claim 16, wherein said predetermined torque divider output speed is equal to the torque divider output speed associated with the engine speed and torque divider output speed correlation selected by said controller based upon the signals received from said first and second sensors.

18. The system, as set forth in claim 16, wherein said predetermined torque divider output speed is adjusted for parasitic loads associated with the work machine.

* * * * *